G. L. LOTZ.
GREASE CUP.
APPLICATION FILED NOV. 25, 1916.

1,249,142.

Patented Dec. 4, 1917.

WITNESSES:
O. Johnson
Frank Warren

INVENTOR
George L. Lotz
BY
C. D. Haskins
ATTORNEY

UNITED STATES PATENT OFFICE.

GEORGE L. LOTZ, OF ANACORTES, WASHINGTON.

GREASE-CUP.

1,249,142.  Specification of Letters Patent.  Patented Dec. 4, 1917.

Application filed November 25, 1916. Serial No. 133,448.

*To all whom it may concern:*

Be it known that I, GEORGE L. LOTZ, citizen of the United States, residing at Anacortes, in the county of Skagit and State of Washington, have invented a certain new and useful Improvement in Grease-Cups, of which the following is a specification.

My invention relates to improvements in grease-cups such as are employed for forcing grease into and through passageways of journal-bearings of machines to lubricate the journals of shafts of such machines, and the object of my invention is to provide a grease-cup of a simple form of construction, a part of which may be quickly removed, filled with grease and replaced in its normal operative position, whereupon the operative parts of said grease-cup may be actuated to cause the grease disposed therein to be forced through a passageway thereof to a desired point of lubrication, and which grease-cup shall have its separable parts so joined that no grease may escape from the cup except through the outlet passageway thereof.

Figure 1:
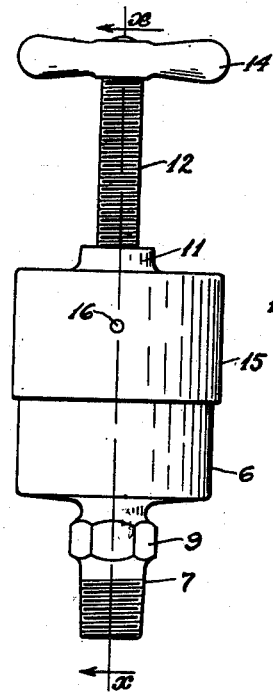
Figure 2:
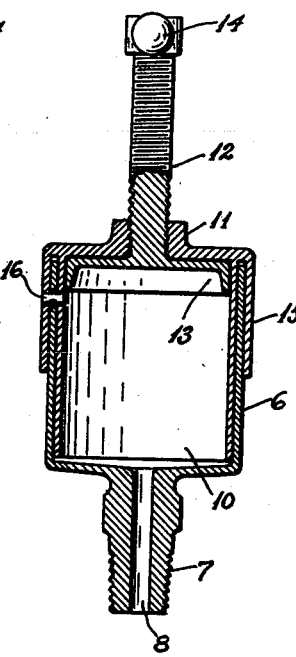
Figure 3:
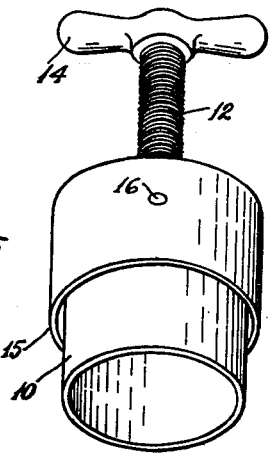
Figure 4:
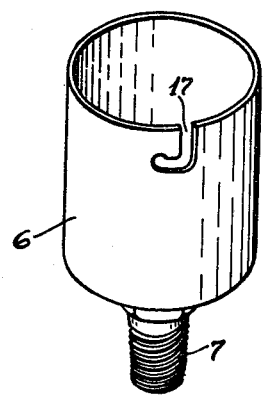
Figure 5:
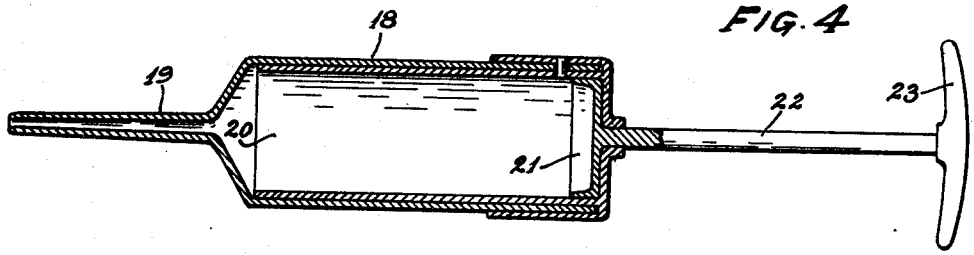

I accomplish this object by devices illustrated in the accompanying drawings wherein Figure 1 is a view in side elevation of a structure embodying my invention; Fig. 2 is a view of the same in vertical mid-section on broken line $x$, $x$ of Fig. 1; Fig. 3 is a view in perspective of associated parts of the same; Fig. 4 is a view in perspective of another part of the same; and Fig. 5 is a view in longitudinal mid-section of another structure embodying my invention wherein parts thereof are of a modified form.

Referring to the drawings, throughout which like reference numerals indicate like parts, in which 6 designates a socket of the form of a hollow cylinder whose closed bottom end portion is provided with an externally screw-threaded nipple 7 through which extends a concentrically disposed passageway 8 which leads to the bottom of the space within said socket 6, and through which passageway 8 grease may be forced from such space, said nipple 7 being provided with a hexagonal portion 9 thus to adapt it to be screwed by means of a wrench into the screw-threaded passageway of a journal bearing that is to be lubricated by grease emitted from socket 6.

Removably disposed within the socket 6 is a closely fitting inverted circular cup 10 whose open lower end terminates at a point adjacent to the bottom of the space within said socket 6 and the wall of whose closed upper end is provided with a concentrically disposed boss 11 through which extends a concentrically disposed screw-threaded hole within which is rotatably disposed the screw-threaded shank 12 of an integral plunger 13 which is disposed within said cup 10 with its periphery closely fitting the inner surface of said cup 10 whereby a rotation of said shank 12 may cause said plunger 13 to move throughout the space within said cup 10, there being a handle 14 removably attached to the upper end portion of said shank 12 to facilitate the operation of rotating said shank 12.

The circular wall which closes the upper end of the cup 10, as shown in Fig. 2, is extended in its diameter beyond a point registering with the exterior surface of the socket 6 and is there provided with an integral sleeve 15 which projects downwardly in close engagement with said exterior surface of said socket 6 thereby increasing the extent of joined surfaces between the integral parts of the cup 10 and the socket 6 to make it more difficult for grease to leak between such joined surfaces.

As more clearly shown in Fig. 2 there is provided a pin 16 which is securely disposed to extend through the sleeve 15 and the cylindrical wall of the cup 10 at a point in the upper portion of said sleeve 15, such pin 16 serves as one member of a bayonet-joint the other member of which comprises an L shaped slot 17 formed in the upper open end portion of the socket 6, as more clearly shown in Fig. 4, thus adapting the telescopic joint between the socket 6 and the parts of the inverted cup 10 to be locked in an obvious manner when, in the operation of inserting the cup 10 into the socket 6, the said cup 6 is moved to a position where the pin 16 will first enter the vertical portion of the slot 17 and then forced to the bottom thereof and thereupon turned in a clockwise direction to cause such pin 16 to be disposed against the blind end of the horizontal portion of said slot 17.

To utilize my invention when embodied in the structure illustrated and described, the nipple 7 is screwed into the lubricating passageway of a journal bearing that is to be lubricated, in which operation a wrench is applied to the hexagonal portion 9 and thereupon the cup 10 is removed from the socket 6 by first turning it in a contra-clockwise direction so that the pin 16 may register with the vertical portion of the slot 17 whereupon said cup 10 may be directly withdrawn from the socket 6 and then the shank 12 is rotated to move the plunger 13 to a position adjacent to the end wall of said cup 10 and thereupon such cup 10 is filled with grease after which it is again inserted in said socket 6 to assume the position shown in Fig. 2, and thereupon it is turned in a clockwise direction to lock the bayonet-joint in an obvious manner, and then the handle 14 is manipulated to rotate the shank 12 to force the plunger 14 against the grease within the cup 10 to cause such grease to be emitted from the passageway 8 into said journal bearing, the amount of grease so emitted being determined by the number of revolutions imparted to the shank 12.

In Fig. 5, I have shown a modified form of my invention wherein a socket 18 corresponds to the socket 6 of Figs. 1, 2 and 4 which socket 18 is provided with a nozzle 19, formed like the nozzle of a syringe, and within such socket 18 is disposed a cup 20 which corresponds in plan of construction to the inverted cup 10 of Figs. 1, 2 and 3, and within said cup 20 is a plunger 21 corresponding to the plunger 13 of Fig. 2, but attached to said plunger 20 is a plane rod-like shank 22 with a handle 23 which shank 22 and handle 23 corresponds in function to the shank 12 and handle 14 of Figs. 1, 2 and 3 except that the shank 22 is directly pushed and directly withdrawn instead of being rotated in the operation of moving its attached plunger 21.

The structure of Fig. 5, thus embodying my invention may serve as a "grease-gun" when filled with grease to deposit such grease in places required by pushing inwardly the shank 22 to force the plunger 21 against such grease thus to cause it to be emitted from the nozzle 19 in an obvious manner.

Manifestly, changes may be made in the forms, dimensions and arrangement of parts of my invention without departing from the spirit thereof.

What I claim is:

A grease cup including a socket having a discharge nipple at one end and a bayonet slot in the other end portion thereof, a closure for said socket provided with a sleeve rigidly carried thereby and adapted to embrace the second-named end portion of said socket, a cup member rigidly carried by said closure and arranged in spaced concentric relation with said sleeve, said cup member being of a length substantially equal to the length of said socket and adapted to be received therein, a pin arranged across a portion of the space between said sleeve and said cup and having one end secured to said sleeve and the other end secured to said cup, said pin being adapted to engage in said bayonet slot, and means for discharging the contents of said socket carried by said closure.

In witness whereof, I hereunto subscribe my name this 27th day of October A. D., 1916.

GEORGE L. LOTZ.

Witnesses:
F. E. BULLOCK,
FRANK WARREN.